United States Patent [19]

Saito et al.

[11] Patent Number: 4,608,628
[45] Date of Patent: Aug. 26, 1986

[54] PROGRAMMABLE CONTROLLER

[75] Inventors: Yashitane Saito, Kameoka; Tetsuo Doi, Kyoto; Kiyoto Hirase, Nagaokakyo, all of Japan

[73] Assignee: Omron Tateisi Electronics Co., Kyoto, Japan

[21] Appl. No.: 506,376

[22] Filed: Jun. 21, 1983

[30] Foreign Application Priority Data

Jun. 21, 1982 [JP] Japan .................................. 57-106531

[51] Int. Cl.⁴ ...................... G05B 19/02; G05B 23/02
[52] U.S. Cl. .................................... 364/141; 364/146; 371/29; 340/825.06; 340/825.17
[58] Field of Search ............... 364/141, 140, 146, 188, 364/189, 900 MS; 371/29, 25; 340/825.06-825.18

[56] References Cited

U.S. PATENT DOCUMENTS

| B 485,575 | 2/1976 | Nakao et al. | 364/900 |
| 3,838,397 | 9/1974 | Watson et al. | 364/900 |
| 4,064,394 | 12/1977 | Allen | 364/140 |
| 4,107,785 | 8/1978 | Seipp | 364/141 |
| 4,129,901 | 12/1978 | Masuda | 364/141 |
| 4,176,395 | 11/1979 | Evelyn-Veere | 364/146 |
| 4,404,625 | 9/1983 | Saito et al. | 364/146 |
| 4,425,630 | 1/1984 | Yomogida et al. | 364/141 |
| 4,486,830 | 12/1984 | Taylor, Jr. et al. | 364/141 |

OTHER PUBLICATIONS

Programming a Hierarchial Robot Control System; 12th Int'l. Symposium on Industrial Robots; Paris, France; Jun. 9-12, 1982.

Primary Examiner—Jerry Smith
Assistant Examiner—Allen MacDonald
Attorney, Agent, or Firm—Stevens, Davis, Miller & Mosher

[57] ABSTRACT

Progressing conditions of sequence control are taken as patterns of input/output data, and a plurality of status patterns are set separately from user programs. The status patterns are expressed by a ternary of ON, OFF and EITHER ON or OFF with respect to all the input/output data. When the status pattern at the time of actual control coincides with the set status pattern, the discrimination number of the pattern is displayed.

2 Claims, 7 Drawing Figures

PROGRAMMABLE CONTROLLER

BACKGROUND OF THE INVENTION

This invention relates to a programmable controller of a scanning type having execution steps represented by a relay ladder diagram type programming.

Most of recent programmable controllers are designed so that sequence circuit diagrams represented by relay ladder diagrams and user programs are repeatedly executed at high speeds. Such a programmable controller is called a scanning type.

When the programmable controller of this kind is actually used, there are provided, in many cases, the following functions in order to monitor the control status by configuration of the user.

There is provided a function in which for example, when the progress in sequence control reaches a certain specific condition, it is indicated by some kind of display. This function is effective to grasp the processing situation of the sequence control.

There is provided a further function in which for example, if an abnormal condition which would not occur in a normal sequence control should occur, the abnormal condition would be indicated. Also, there is provided a function which gives an alarm or stops the operation of a certain device when such an abnormal condition as described above occurs. These functions are effective to promptly indicate the occurrence of abnormal conditions so that appropriate measures can be taken.

In the conventional programmable controller, the above-mentioned status monitoring functions have been realized by making programs in a manner similar to the sequence control program. That is, in order to realize the display of the progressing condition of sequence control and the processing of the abnormal conditions corresponding thereto, the user has incorporated predetermined display circuits and abnormal condition processing circuits into user programs, for example, in accordance with the programming system by the relay ladder diagram.

However, this system poses a problem in that if a scale of the programs for the display circuits and abnormal condition processing circuits occupied in the user programs increases, an area of the user program that may be actually used effectively decreases.

Furthermore, if the number of input/output contacts in connection with the display circuits or the like increases, it becomes extremely cumbersome to accurately recognize the logical relation therebetween to constitute the desired display circuits or the like. It is not possible for those other than persons familiar with the programmable controller and control object system to do so.

There is a further problem in that if a number of output relays have to be used for the above-described display circuits and abnormal condition processing circuits, the number of output relays available for the original purpose of control decreases.

SUMMARY OF THE INVENTION

It is an object of the present invention to provide a programmable controller in which the processing status of the sequence control is grasped as a pattern of input/output data, a plurality of status patterns are set separately from the user program, and when a status pattern at the time of actual control is in coincidence with the set status pattern, the discrimination number of the pattern is displayed.

It is a second object of the present invention in which, in addition to the display of the discrimination number of a pattern as described above, the data of the discrimination number can be utilized as an object for the operation of a user command.

To achieve the aforementioned objects, the present invention provides an arrangement characterized by means for setting and storing a plurality of patterns, each pattern comprising a status pattern freely expressed by a ternary which can be ON or OFF or EITHER ON or OFF with respect to all input/output data, means for comparing whether the actual status of the input/output data coincides with any of the stored status patterns keeping pace with the execution of a user program, and means, when such a coincidence is detected by the comparing means, for displaying the discrimination number of the coincided status pattern.

In addition, to achieve the above-described second object, the present invention is characterized by, in addition to the above-mentioned structures, data update means wherein when the coincidence is detected by the comparing means, data of the discrimination number of the coincidence status pattern are stored in auxiliary memories which are freely accessible in accordance with a user's command.

In the programmable controller provided with the status pattern comparing function of the above-described type, the display circuit for displaying the progressing condition of the sequence control and abnormal condition processing circuit for the output of an alarm are not incorporated in the user program, but if patterns of input/output data indicating specific control conditions are freely set separately from the user program, when the control status comes into coincidence with the pattern during the execution of the user program, the discrimination number of the pattern is displayed.

Since the discrimination number of the coincided pattern is stored in the auxiliary memory which is accessible by the user's command, the data is merely subjected to programming in the user program so as to be an object for operational processing, whereby the desired abnormal condition processing can be accomplished simply.

Accordingly, the user program is not uselessly lengthy to monitor the status, and a limited capacity of user program can be effectively utilized for substantial sequence control.

Furhtermore, since the status monitoring is completely separated from the user program, an error is eliminated in that when the function of status monitoring is changed, each logic of a user program is not erroneously broken down.

Moreover, even if there are a multiplicity of input/output data which constitute conditions for monitoring the status and their logical relation is complicated, such data can be merely grasped as static patterns of the input/output data, and therefore, setting and registration for the status monitoring as required can be accomplished extremely easily and understood easily.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
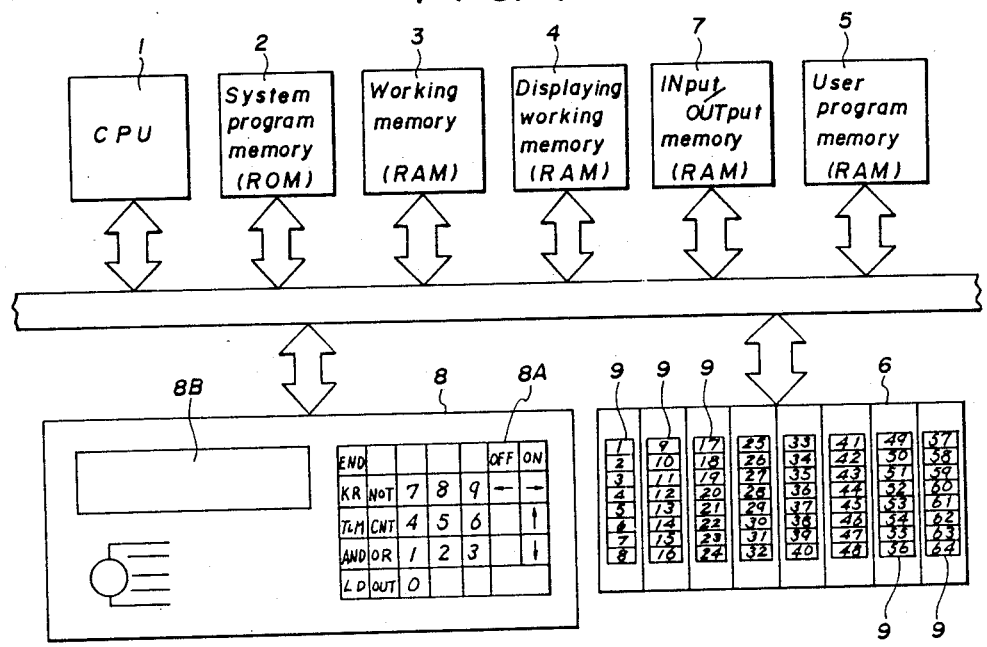
FIG. 1. is a block diagram showing a schematic structure of a programmable controller to which this invention is applied.

FIG. 1 is a block diagram showing a schematic structure of the whole programmable controller to which this invention is applied. This programmable controller comprises a CPU 1 (Central Processing Unit) which constitutes the hub of controlling the whole system, a system program memory in which system programs executed by the CPU 1 are stored, a working memory 3 and a displaying working memory 4 used as a temporary storing area for various variable data by the CPU 1, a user program memory 5 in which sequence control programs freely set by the user are stored, an input/output unit 6 (which is a general term of an input unit and an output unit) including an input interface to which an external input signal is applied and an output interface from which an external output signal is delivered, an input/output memory 7 in the form of a buffer memory for input/output of data corresponding to the input/output unit 6, and a program console 8 which puts out various operating commands to the CPU 1 or receives inputs for preparation of user programs or monitor instruction inputs and which provides a display.

The aforesaid input/output unit 6 is divided into an input unit and an output unit, which are respectively unified, said units each being provided with eight input terminals and output terminals. A reference numeral 9 in FIG. 1 designates a terminal plate for each unit of the input/output unit 6. Numerals assigned to each of terminal plates 9 indicate the input/output number. That is, the input/output unit 6 is this embodiment is composed of eight input/output units, which can handle $8 \times 8 = 64$ input/output signals of, and the input/output numbers from 1 to 64 are assigned to each of input/output signals (input/output terminals).

The program console 8 comprises a key board 8A including ten keys, command code keys and other function keys, and a dot matrix type display device 8B for displaying command codes, addresses or error messages by characters.

Figure 2:
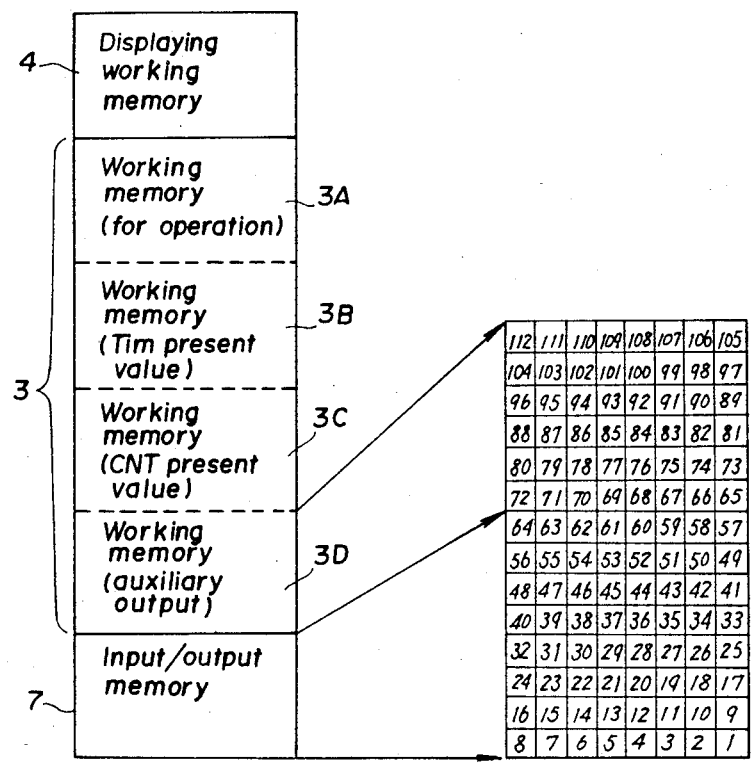
FIG. 2 shows a memory map of a RAM region in the controller.

As shown in FIG. 2, the working memory 3 is divided into an operating area 3A, an area 3B in which present values of timer commands are stored, an area 3C in which present values of counter commands are stored, and an area 3D in which data for auxiliary outputs (internal relays) are stored. The input/output memory 7 has an area of 64 bits in which each input/output data 1–64 in the input/output unit 6 are stored. The area 3D stores therein each auxiliary output data of 65–112 following the address of final data (64) of input/output data stored in the input/output memory 7, and an area of 4 bits from 109 to 112 among them is utilized as an auxiliary memory in accordance with the present invention.

As is known, the operation for executing the user program in the programmable controller of this kind is to read user commands from the user program memory 5 in order, operate and process the input/output data stored in the input/output memory 7 in accordance with the respective user command, and update the designated output data by the result of the operation and processing. In synchronism with the user program, there are carried out an operation (input update) wherein input data applied to the input/output unit 5 is written in a predetermined area of the input/output memory 7, and an operation (output update) wherein output data in a predetermined area of the input/output memory 7 is transferred to the input/output unit 6.

The sequence status designated in the user program is produced by the aforementioned operations in the relation between the external input signal applied to the input/output unit 6 and the external output signal put out from the input/output unit 6.

It is well known that the objects subjected to operation and processing in the user program include not only the input/output data of the input/output unit 6 but the timer command, the counter command and the data concerning the auxiliary output.

The programmable controller in this embodiment has, in addition to the function of executing the user program, a function which always monitors whether or not the data for input/output status of the input/output memory 7 coincides with status patterns of some input/output data, and when they coincide, the number of the pattern is displayed on the program console, and a function which stores the data of the number in the auxiliary memory of area 3D.

Figure 3:
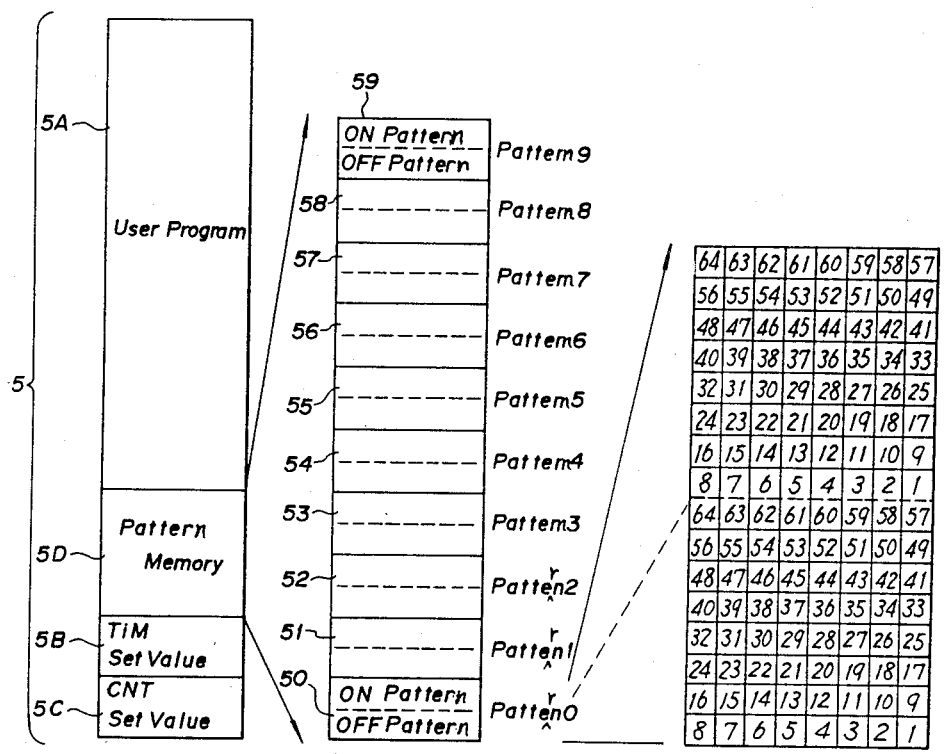
FIG. 3 shows a memory map of a user program memory in the controller.

As shown in FIG. 3, the user program memory 5 has an area 5A for storing therein a column of user commands, an area 5B for storing therein set values of timer commands, an area 5C for storing therein set values of counter commands, and in addition, an area for the pattern memory 5D which forms the subject matter of the present invention.

The pattern memory 5D comprises areas for ten patterns indicated at reference numerals 50–59, each area having the corresponding pattern numbers from 0–9 assigned thereto. A pattern memory area for one pattern portion is further divided into two areas, i.e., an ON pattern area and an OFF pattern area. Both the ON pattern area and OFF pattern area have a capacity of 64 bits which correspond to the input/output memory 7 in the ratio of 1:1. That is, the area for one pattern portion comprises a capacity of $64 \times 2 = 128$.

In the programmable controller in accordance with the present invention, in respect of all input/output data of 64 bits, free status patterns expressed by a ternary which can be ON or OFF or EITHER ON or OFF may be set for ten pattern portions to said pattern memory 5D and stored therein.

One pattern is set in the following procedure. For example, where the ON with respect to the input/output number 1 is registered, the bit of the number 1 of the ON pattern area is set to "1". Where the OFF with respect to the input/output number 2 is set and registered, the bit of the number 2 of the OFF pattern area is set to "1". Where the "EITHER ON or OFF" with respect to the input/output number 3 is set and registered, both the bits of the number 3 of the OFF pattern area and the number 3 of the ON pattern area are set to "0". In this matter, the status patterns for portions of 64 bits may be freely set.

Figure 4:
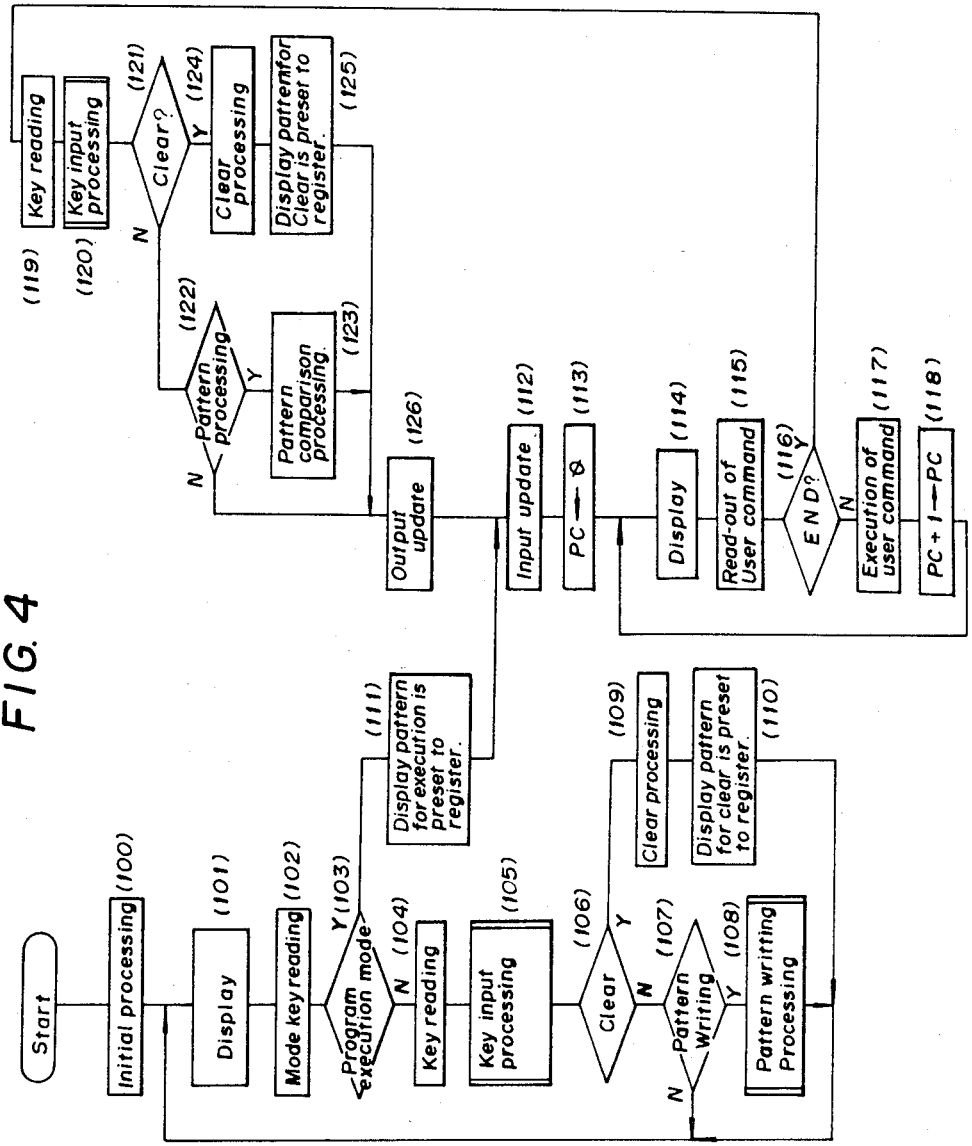
FIGS. 4, 5 and 6 are respectively flow charts showing the structure of a system program executed by a CPU in the controller.

FIG. 4 is a flow chart showing the outline of the system program executed by the CPU 1. The system program will be described with reference to this flow chart. First, initial processing 100 and display processing 101 are executed and thereafter, mode keys on the program console 8 are read (Step 102) to judge whether or not the program execution mode is present (Step 103). If the mode is not the program execution mode, key inputs of the program console 8 are then read to carry out the processing in accordance with the key input (Steps 104 and 105).

Where the clear key is depressed, predetermined clearing processing is carried out to preset a display pattern of the clear status to a register (Steps 106, 109 and 110), after which the system returns to the display processing 101.

When a mode is set to the mode other than the program execution mode and a pattern writing key is depressed, pattern writing processing is executed (Steps 107 and 108).

Figure 5:
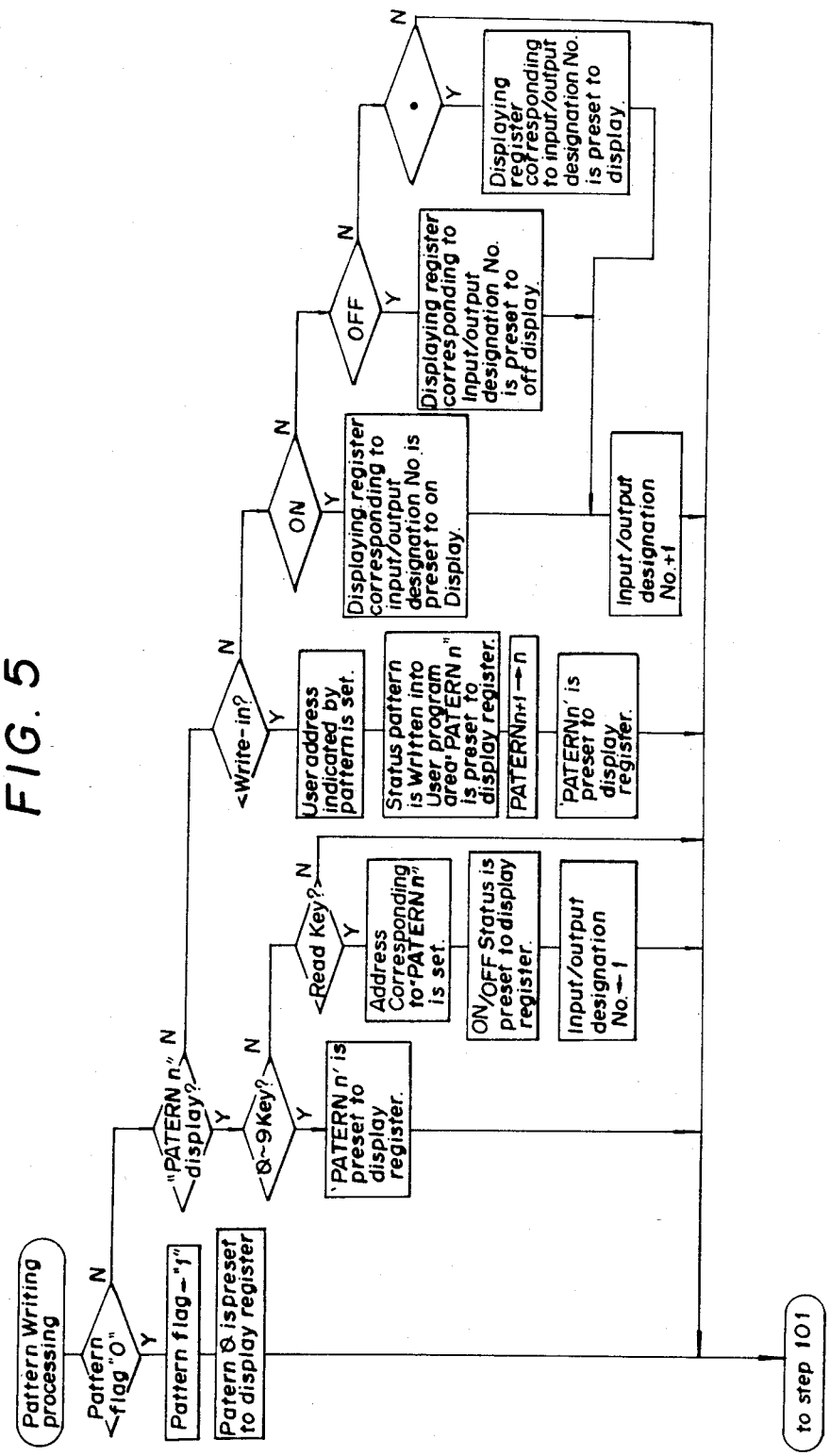

One specific example of the aforesaid pattern writing processing 108 is shown in a flow chart of FIG. 5. The operator operates the key board 8A of the program console 8 to specifiy the pattern number of the ON-OFF pattern, and specify whether or not the input/output data of the 64 bits are set and registered to be ON, OFF or "EITHER ON or OFF" in correspondence to the pattern number. The above-described pattern writing processing is carried out as requested in response to input from the key board 8A.

That is, when the pattern writing processing is executed, the ON pattern and OFF pattern as previously explained are prepared in any of areas 50-59 of pattern numbers in pattern memory 5D.

The pattern writing processing further includes the step of processing for displaying the ON-OFF pattern in the midst of the operation on the display device 8D of the program console. In this display processing, for example, digits of the display device 8B are made to correspond to the input/output data of 64 bits to display the status of a ternary of ON, OFF or "EITHER ON or OFF" in the digit position.

Next, the execution mode for the user program will be described with reference to FIG. 4. When the key mode is set to the program execution mode, processing for carrying out a display indicative of the execution mode on the display device 8B (Step 111), and the program execution processing of Step 112 and succeeding steps progress. First, the above-mentioned input updating is carried out (Step 112), and then program counter PC for addressing the user program memory 5 is cleared (Step 113). Subsequently, the display processing is carried out (Step 114) and then the user command to be addressed by the program counter PC is read from the memory 5 (Step 115) to judge whether or not the user memory is the final END command (Step 116) and if it is not the END command, the command is executed (Step 117). Then the program counter PC is incremented (Step 118) and the processing is returned to Step 114 to read and execute subsequent commands in a manner similar to that as described hereinbefore.

When the last user command is executed, the processing progresses from Step 116 to Step 119 to read an input from the key board 8 to effect the processing in accordance with the key input (Step 120). Where neither the clear key nor the pattern processing key is operated, the processing progresses to Step 126 through Steps 121 and 122 to effect output updating, and the processing again starts from Step 112.

If the clear key is depressed, the requested clearing processing and the processing for clearing the display are carried out (Steps 124, 125) and thereafter, the processing progresses to Step 126.

If the pattern processing key is in ON position, the pattern comparing processing (Step 123) which constitutes the essential part of the present invention is executed and thereafter the ouput updating of Step 126 is carried out and the processing again progresses to the execution processing of the user program from Step 112.

As is apparent from FIG. 4, while the pattern processing key remains ON, the pattern comparing processing 123 is executed every one cycle execution, keeping pace with the execution of the user program.

This pattern comparing processing 123 can compare whether the status of the input/output data of 64 bits of the input/output memory 7 coincides with any of status patterns stored in the pattern memory 5D. When the coincidence therebetween is detected by the comparing processing, the processing is carried out in which the pattern number of the thus coincided status pattern is displayed in the display device 8B. At the same time, the processing is carried out in which the pattern number of the above-described coincided status pattern is stored in the areas 109 to 112 (the above-mentioned auxiliary memories) of the working memory 3D.

Figure 6:
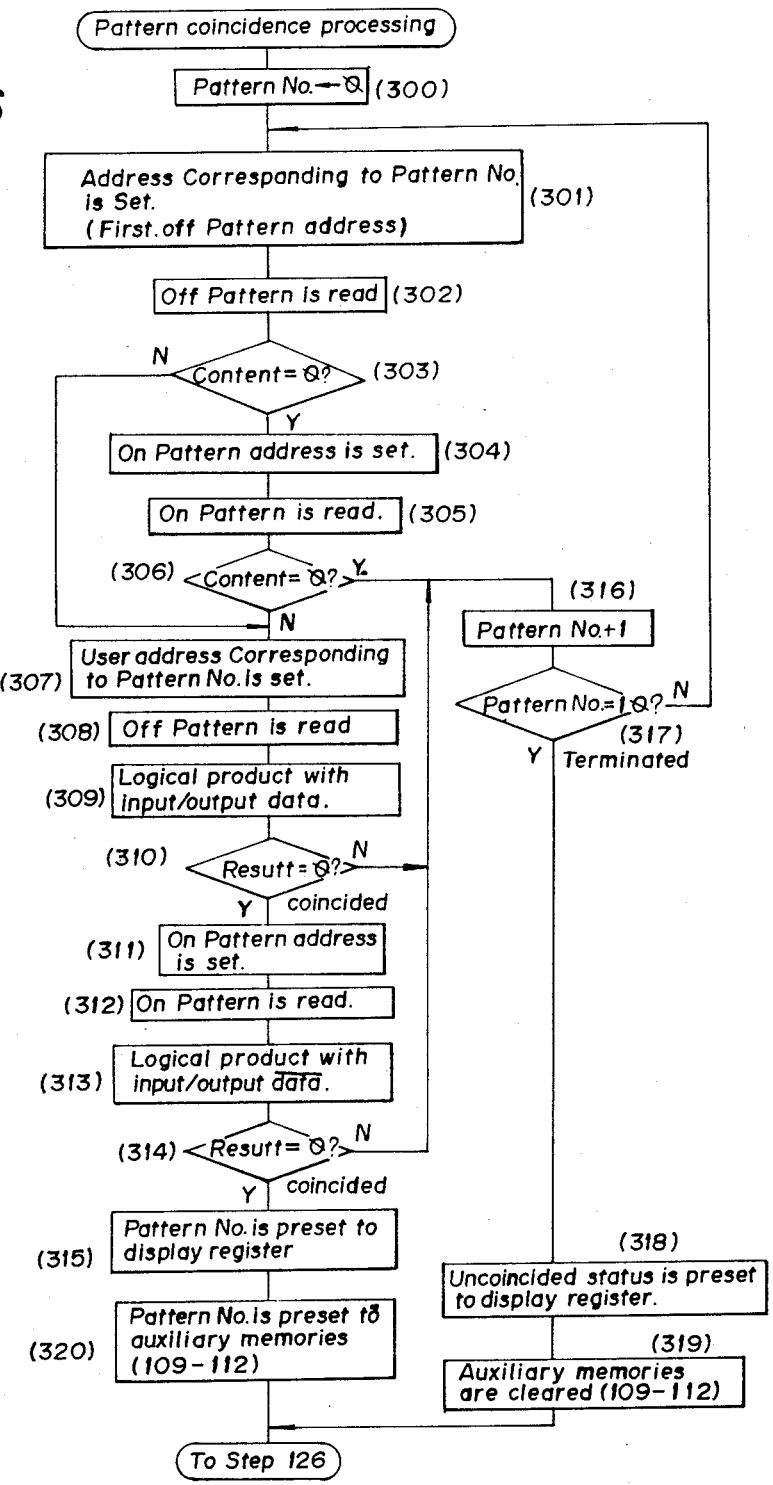

The above-described pattern comparing processing is shown in detail in a flow chart of FIG. 6. Referring now to FIG. 6, the pattern number is first set to 0 (Step 300), an OFF pattern in the pattern memory corresponding to the pattern number is read (Steps 301, 302) to judge whether all the 64 bits of the OFF pattern are "0" (Step 303), and if all the bits are "0", an ON pattern of said pattern number is then read (Steps 304, 305) to judge whether all the 64 bits of the ON pattern are "0" (Step 306). If all the patterns are "0", it can be judged that nothing is set to the pattern number, and the pattern number is set to the next number (Step 316) to judge whether the pattern number is 10, that is, whether processing to the pattern number 9 is terminated (Step 317), and if not so, the above-described processings after Step 301 are carried out with respect to the next pattern number.

If some kind of status pattern are set to the pattern memory of a certain pattern number, the processing progresses to Step 307. In this case, the OFF pattern of the pattern memory of said pattern number is read (Steps 307, 308) to compare it with the data of the input/output memory 7 (Step 309). This comparison is accomplished by taking the logical product for each one bit for the respective numbers with respect to the data of 64 bits of the OFF pattern in the pattern memory and the data of 64 bits of the input/output memory 7. The next step 310 judges whether or not all the results of logical product for each one bit of 64 bits are "0". If all the results are "0", the coincidence with respect to the OFF pattern is present but if even one result is "1", the coincidence with respect to the OFF pattern is not present.

If not in coincidence, the processing progresses to the preceding Step 316.

If in coincidence, the processings after Step 311 progresses to judge whether or not the coincidence is present with respect to the ON pattern. That is, the ON pattern of the number is read (Steps 311, 312), and the logical product of bits of the ON pattern and complement (inverted logic) of data of the input/output memory 7 is taken bit by bit to carry out the comparison between the patterns (Step 313). Judgement is made to see if all the 64 bits obtained as the result of the logical product are "0" (Step 314). If all the bits are not "0", the pattern is not coincident, in which case, the process progresses to the preceding Step 316. If all the results obtained are "0", the pattern is coincident, in which case, the pattern number is preset to the displaying register in the suceeding Step 315 and the pattern number is preset to the auxiliary memories (109–112).

It is noted that the auxiliary memories are made to have four bits because the present embodiment has ten kinds of status patterns, which can be expressed by weighting the bits of 109 to 112.

Thereby, in the display processing in Step 114 shown in FIG. 4, the pattern number of the status pattern in coincidence with the display device 8B is displayed. When, for example, the user command which is the abnormal condition processing command is read in the succeeding Step 115, the contents of the auxiliary memories (109 to 112) are read, which are then subjected to processing in accordance with the contents (logical product of four bits) in Step 117 next to Step 116, for example, subjected to suitable processing such as alarm output, program stoppage or the like. A specific example of Step 117 is shown in FIG. 7.

Figure 7:
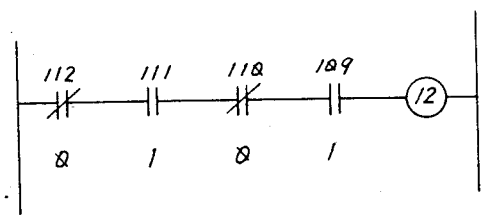
FIG. 7 is a view in the form of a relay ladder diagram showing an example wherein the pattern numbers stored in auxiliary memories are incorporated into a user program.

FIG. 7 shows a program when an abnormal condition processing command is executed by way of a ladder circuit representation. Bits of the auxiliary memories are weighted with 1, 2, 4, 8 in order from Step 109. In the illustrated example, it programmed so that when the pattern number is "5", the output relay 12 is turned on.

If the input/output data of the input/output memory 7 are not coincident with all the set status patterns, the processing progresses from Step 317 to Step 318 to display that the patterns are not coincident, and in the succeeding Step 319, all the bits of the auxiliary memories 109–112 are set to "0". If the non-coincident is one detected, the displayed pattern numbers and contents of the auxiliary memories 109–112 remain as they are until the coincidence is detected later.

While in the above-described embodiments, the pattern numbers have been coded and then stored in the auxiliary memories, it should be of course understood that the bits of the auxiliary memories can be made to correspond to the pattern numbers in the ratio of 1:1. In this case, the output relay is driven in correspondence to the pattern number in the ratio of 1:1.

As many apparently widely different embodiments of this invention may be made without departing from the spirit and scope thereof, it is to be understood that the invention is not limited to the specific embodiments thereof except as defined in the appended claims.

What is claimed is:

1. A programmable controller, comprising:
    means for cyclically executing a user program;
    means for storing a plurality of status patterns, each of said status patterns having an assigned discrimination number and a plurality of binary digit positions corresponding to input and output data associated with execution of said user program, each of said digit positions being settable to an ON, OFF, EITHER ON or EITHER OFF state;
    means for determining the acutal status of input and output data and for comparing whether the actual status of said input and output data bears a predetermined correspondence to one of said stored status patterns, said comparison being performed for every cycle of operation of said user program; and
    means for displaying, when said predetermined correspondence exits, the discrimination number of a status pattern which bears said predetermined correspondence to said actual status of input and output data.

2. A programmable controller according to claim 1, wherein said controller further comprises data update means which, when said predetermined correspondence is detected by said comparison means, stores data corresponding to the displayed discrimination number in an auxiliary memory which is freely accessible by a user command.

* * * * *